United States Patent Office 2,859,209
Patented Nov. 4, 1958

2,859,209
PROCESS FOR POLYMERIZING VINYL ALKYL ETHERS

Robert R. Dreisbach and John L. Lang, Midland, Mich., assignors to The Dow Chemical Company, Midland, Mich., a corporation of Delaware No Drawing. Application December 27, 1955
Serial No. 555,236

3 Claims. (Cl. 260—79.3)

This invention relates to a new process for polymerizing certain monovinyl alkyl ethers. More particularly, it relates to a process for producing a water-soluble polymer from monovinyl beta-choloro alkyl ethers.

Monovinyl alkyl ethers have been known to polymerize for a long time. Such ethers are readily available and inexpensive and form potentially useful polymers. However, their utility has never been completely exploited due to the insolubility of the polymers, which limited their usefulness in coating and casting operations. With highly stable polymers, such as polystyrene, it has been possible to add certain polar groups by processes, such as sulfonation, to provide water-soluble polymers. However, due to the sensitivity of the ether linkage to hydrolysis and to the insolubility of the polymer it was difficult to add substitutent groups to a vinyl alkyl ether polymer to impart water solubility and still retain the basic polyvinyl alkyl ether structure. It would be highly desirable if a water-soluble polyvinyl alkyl ether could be produced.

It is the principal object of this invention to provide a process for producing water-soluble polymers from certain monovinyl haloalkyl ethers.

It is a further object to provide such a process whereby the solubilizing groups are substituted during the polymerization.

The above and related objects are accomplished by means of a process wherein a vinyl beta-haloalkyl ether is polymerized in aqueous medium in the presence of a persulfate catalyst and a sulfonating compound. The polymerization and sulfonation occur simultaneously eliminating any need for a second step in the reaction or for a separate polymer isolation step. The resulting polymers are soluble in hot water but insoluble in cold water.

The vinyl beta-haloalkyl ethers which may be employed in the process of this invention are those in which the alkyl group contains from 1 to 10 carbon atoms. Ethers with larger alkyl groups may be employed, but such monomers are difficult and expensive to prepare, polymerize slowly, and no additional benefits accure from using such materials. It is preferred that the halogen is chlorine and that the chlorine be in the beta position in the alkyl group, for the reasons that those monomers are more available and the chlorine in that position is sufficiently active to react under the relatively mild conditions employed in this process.

The polymerization catalyst which should be employed is preferably a water-soluble persulfate, such as potassium or ammonium persulfate.

The sulfonating materials which are operable are the water-soluble inorganic salts selected from the group consisting of sulfites, bisulfites, meta-bisulfites, and thiosulfates. It is preferred to use stoichiometric proportions or an excess of the sulfonating materials, although from 50 to 100 percent by weight based on the weight of the ether may be employed. When an excess is used, the viscosity depressing effect of electrolytes is encountered.

The polymers become water-soluble when the halogen atoms on about one-half of the beta-haloalkyl groups have been replaced by the sulfur-oxygen group. Thus, when 50 percent of the sulfonating material is used, the reaction must be carried to completion. When more of the sulfonating material is employed, the reaction may be stopped short of completion and an aqueous solution of polymer obtained.

The temperatures which may be used may be varied from 50° C. to 250° C., preferably 160° C. to 240° C. It should be obvious that when the higher temperatures are employed, the reaction will have to be conducted under pressure but will require a shorter time for the reaction to be completed.

The ratio of the amount of monomer to the amount of water may be varied from 1 part by weight of monomer to 1 part by weight of water up to 1 part monomer to 4 parts water. Other ratios may be used but when smaller amounts of water are used temperature control becomes difficult and when larger amounts are used the amount of polymer produced per unit volume of polymerization vessel space is so low as to make the process uneconomical.

The polymers produced by this process are in solution after polymerization is complete. When small amounts of monomer are used the resulting solution is viscous and clear and when larger amounts are used the solution becomes correspondingly more viscous until a gell is formed. Thus, by adjusting the amounts of water and monomer, the proper viscosity solution may be directly obtained without any intermediate steps.

The polymers produced in accordance with the process of this invention find utility as textile sizing materials, gums, adhesives, soil conditioners, and thickeners. When, for shipping or storing purposes, it is desired to isolate the polymers, they may be obtained by chilling the aqueous solution and filtering, by evaporation, or by addition of a water-immiscible non-solvent. The polymers may be redissolved by stirring into hot water.

The process of the invention will be more apparent from the following illustrative example in which all parts are by weight.

Example

Into a polymerization vessel was placed 80 parts of water, 20 parts of vinyl 2-chloroethyl ether, 20 parts sodium bisulfite, and 0.8 part ammonium persulfate. Polymerization was initiated by warming the charge to 50° C. with agitation. After polymerization was complete the result was a viscous aqueous solution of polymer. The hot solution was cast onto a glass plate and dried at 100° C. overnight. When the film was stripped from the plate it was found to be clear and flexible.

We claim:

1. A process for producing water-soluble polymers consisting of dispersing in aqueous medium a vinyl beta-haloalkyl ether wherein the alkyl group contains from 2 to 10 carbon atoms together with from 50 to 100 percent by weight based on the weight of said ether of a water-soluble inorganic salt selected from the group consisting of sulfites, bisulfites, meta-bisulfites, and thiosulfates, and subjecting said materials to a temperature of 50° to 250° C. in the presence of catalytic quantities of a water-soluble persulfate until polymerization is substantially complete and the halogens of at least half of the vinyl beta-haloalkyl ethers have been replaced by a sulfonate group.

2. The process claimed in claim 1, wherein the vinyl beta-haloalkyl ether is vinyl-beta-chloroethyl ether.

3. The process claimed in claim 1, wherein the water-soluble inorganic salt is sodium bisulfite.

References Cited in the file of this patent
UNITED STATES PATENTS 2,643,986    Ham et al. _____ June 30, 1953